US012611880B2

(12) United States Patent
Someya

(10) Patent No.: US 12,611,880 B2
(45) Date of Patent: Apr. 28, 2026

(54) PRINTING APPARATUS, METHOD OF CONTROLLING PRINTING APPARATUS, AND NON-TRANSITORY COMPUTER-READABLE MEDIUM CONTAINING COMPUTER-EXECUTABLE INSTRUCTIONS

(71) Applicant: BROTHER KOGYO KABUSHIKI KAISHA, Nagoya (JP)

(72) Inventor: Masaru Someya, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 167 days.

(21) Appl. No.: 18/422,331

(22) Filed: Jan. 25, 2024

(65) Prior Publication Data

US 2024/0253377 A1 Aug. 1, 2024

(30) Foreign Application Priority Data

Jan. 26, 2023 (JP) ................................ 2023-010365

(51) Int. Cl.
*B41J 29/393* (2006.01)
*B41J 2/045* (2006.01)

(52) U.S. Cl.
CPC .......... *B41J 29/393* (2013.01); *B41J 2/04551* (2013.01)

(58) Field of Classification Search
CPC ...................................................... B41J 29/393
See application file for complete search history.

(56) References Cited

U.S. PATENT DOCUMENTS

2022/0314602 A1 10/2022 Amano et al.

FOREIGN PATENT DOCUMENTS

DE 4034071 C2 * 12/1993 ............. B41J 11/22
JP 2004-136488 A 5/2004
JP 2022-154995 A 10/2022

* cited by examiner

*Primary Examiner* — Justin Seo
(74) *Attorney, Agent, or Firm* — Scully, Scott, Mutrphy & Presser, P.C.

(57) ABSTRACT

A printing apparatus includes a head, a carriage, a casing, a sound sensor configured to collect first sound, an output device and a controller. The controller performs causing the carriage to move and causing the sound sensor to collect second sound that is generated when the carriage is being moved, and causing the output device to output guide information related to an installation place of the casing based on a volume value corresponding to the second sound.

14 Claims, 5 Drawing Sheets

PRINTING APPARATUS, METHOD OF CONTROLLING PRINTING APPARATUS, AND NON-TRANSITORY COMPUTER-READABLE MEDIUM CONTAINING COMPUTER-EXECUTABLE INSTRUCTIONS

REFERENCE TO RELATED APPLICATIONS

This application claims priority from Japanese Patent Application No. 2023-010365 filed on Jan. 26, 2023. The entire content of the priority application is incorporated herein by reference.

BACKGROUND ART

The present disclosures relate to a printing apparatus, a method of controlling the printing apparatus, and a non-transitory computer-readable medium containing computer-executable instructions.

Conventionally, there has been known liquid ejection devices. An example of such conventional liquid ejection devices is an inkjet printer having a print head configured to eject ink droplets to a printing medium, and a carriage configured to move the print head relative to the printing medium. Such an inkjet printer is typically configured to print an image on a printing medium by moving the print head with use of the carriage, while causing the print head to eject ink droplets toward the printing medium.

DESCRIPTION

Conventional liquid ejection devices may vibrate under a force due to a reaction caused by the movement of the print head during printing. Therefore, if an installation place of the liquid ejection device is not appropriate, for example, if the liquid ejection device is installed on an unstable place, the vibration of the liquid ejection device may cause a desk or the like on which the liquid ejection device is installed to wobble, thereby noises may be generated. In such a case, the place where the liquid ejection device is installed is wobbling when the liquid ejection device is operating, resulting in a relatively louder noise.

According to aspects of the present disclosures, there are provided a printing apparatus, a control method for the printing apparatus, and a non-transitory computer-readable medium containing computer-executable instructions to be executed by a computer of the printing apparatus, which can suppress generation of the relatively louder noise (e.g., the noise louder than operating sound of the printing apparatus itself) due to the wobbling of the installation place where the printing apparatus 10 is installed when the printing apparatus is operating.

According to aspects of the present disclosures, there is provided a printing apparatus, including a head configured to eject ink droplets, a carriage mounting the head thereon, a casing accommodating the head and the carriage, a sound sensor configured to collect first sound and output a sound signal corresponding to the first sound, an output device configured to output information, and a controller. The controller is configured to perform causing the carriage to move and causing the sound sensor to collect second sound that is generated when the carriage is being moved and is different from the first sound, and causing the output device to output guide information regarding an installation place of the casing based on a second volume value corresponding to the second sound.

Further, according to aspects of the present disclosures, there is provided a method of controlling a printing apparatus including a head configured to eject ink droplets, a carriage mounting the head thereon, a casing accommodating the head and the carriage, a sound sensor configured to collect first sound and output a sound signal corresponding to the first sound, and an output device configured to output information. The method includes causing the carriage to move and causing the sound sensor to collect second sound that is generated when the carriage is being moved and is different from the first sound, and causing the output device to output guide information regarding an installation place of the casing based on a second volume value corresponding to the second sound.

Furthermore, according to aspects of the present disclosures, there is provided a non-transitory computer-readable medium containing computer-executable instructions to be executed by a computer of a printing apparatus including a head configured to eject ink droplets, a carriage mounting the head thereon, a casing accommodating the head and the carriage, a sound sensor configured to collect first sound and output a sound signal corresponding to the first sound, an output device configured to output information, and a controller. The instructions cause, when executed by the controller, the printing apparatus to perform causing the carriage to move and causing the sound sensor to collect second sound that is generated when the carriage is being moved and is different from the first sound, and causing the output device to output guide information related to an installation place of the casing based on a second volume value corresponding to the second sound.

PRINTING DEVICE

Figure 1:
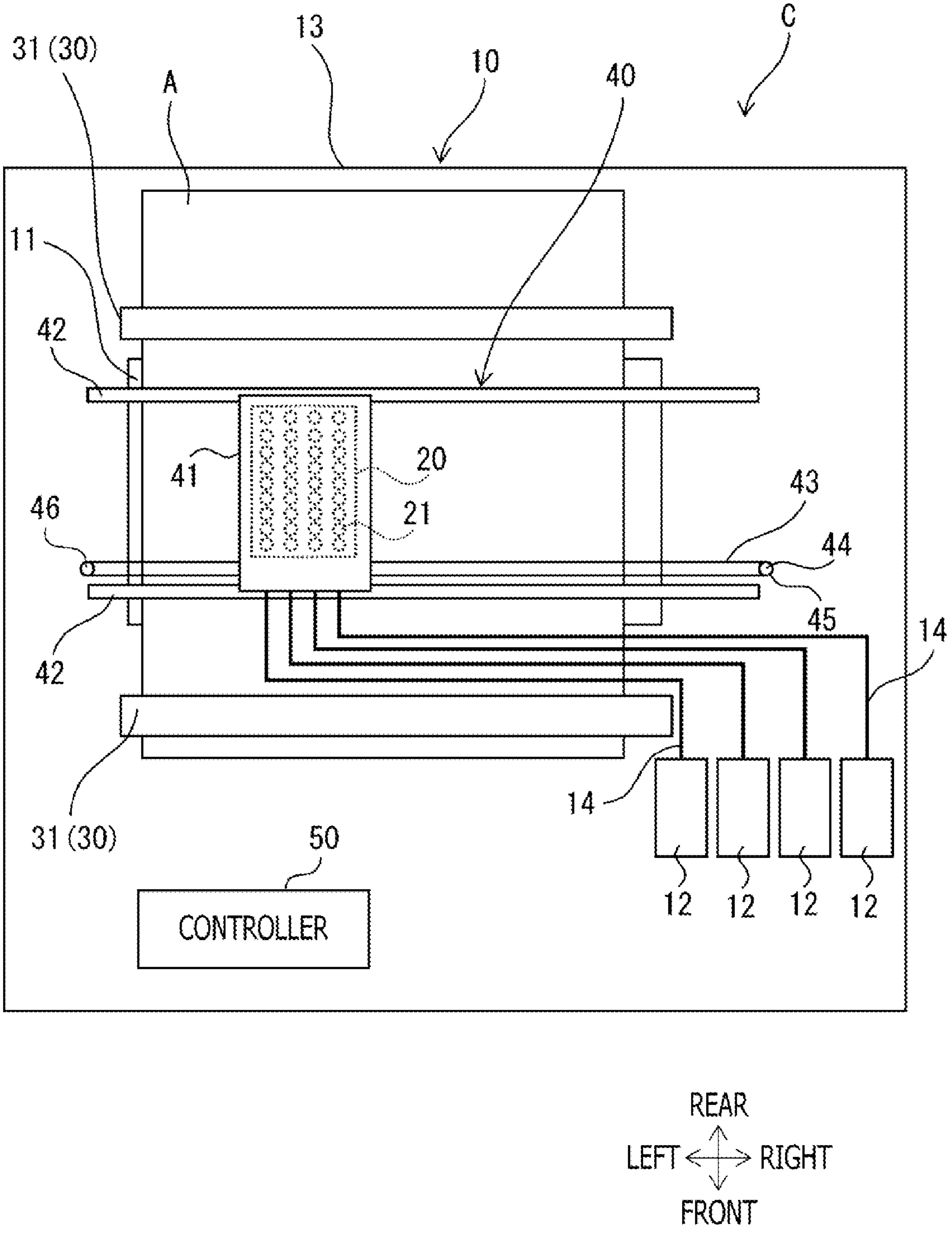
FIG. 1 is a plan view schematically showing a structure of a printing apparatus.

FIG. 1 schematically shows a configuration of an inkjet printer, which is an example of a printing apparatus 10 according to aspects of the present disclosures. The printing apparatus 10 is configured to eject ink droplets from nozzles 21 of a head 20 toward a printing medium A to form an image on the printing medium A. The printing medium A is, for example, a sheet type medium such as paper or cloth.

The printing apparatus 10 is of a serial head type, and is provided with the head 20, a platen 11, ink tanks 12, a casing 13, a conveying device 30, a moving device 40 and a controller 50. The moving device 40 has a carriage 41 configured to mount the head 20 thereon. In the following description, a direction in which the carriage 41 moves will be referred to as a right-left direction (see FIG. 1). Further, a direction, which intersects with (e.g., perpendicular to) the moving direction of the carriage 41 (i.e., the right-left direction), and in which the printing medium A is conveyed by the conveying device 30, will be referred to as a front-rear direction (see FIG. 1). Still further, a direction intersecting with both the moving direction of the carriage 41 (i.e., the right-left direction) and the conveying direction of the printing medium A (i.e., the front-rear direction) will be referred to as an up-down direction (e.g., a direction perpendicular to a plane of FIG. 1). It should be noted that an arrangement of the printing apparatus 10 is not necessarily limited to one shown in FIG. 1.

The casing 13 is installed on an installation place C, such as a stand, and accommodates the head 20, the platen 11, the tanks 12, the conveying device 30, the moving device 40, and the controller 50. The platen 11 is located below the head 20 at a particular distance. A planar top surface of the platen 11 is arranged opposite to a lower surface of the head 20, and supports the printing medium A from below.

Figure 2:
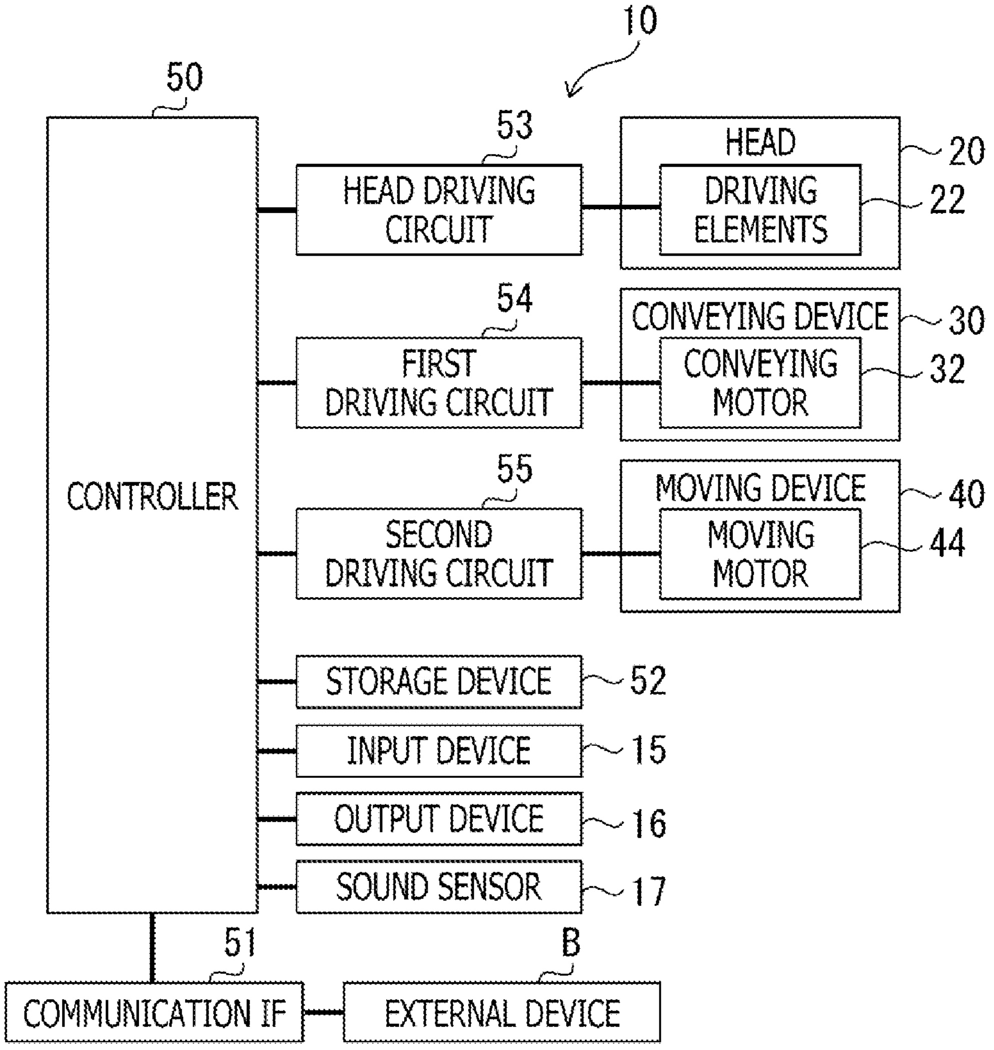
FIG. 2 is a block diagram illustrating a functional configuration of the printing apparatus.

The head 20 has multiple nozzles 21 and multiple driving elements 22 (see FIG. 2). The nozzles 21 are formed on a lower surface of the head 20 and opened downward. The driving elements 22 are piezoelectric elements, heating elements, electrostatic actuators, or the like. The driving elements 22 are provided to respective nozzles 21 and apply pressures to the ink inside the head 20 to cause the ink droplets to be ejected from the multiple nozzles 21, respectively.

The tanks 12 are reservoirs configured to store ink to be supplied to the head 20. The multiple tanks 12, for example, store different types of ink, such as cyan, magenta, yellow, and black ink, respectively. Each tank 12 is connected to the head 20 by a flexible tube 14. The ink is supplied from each tank 12 to the head 20 through the tube 14.

The conveying device 30 has a conveying roller 31 (see FIG. 1) and a conveying motor 32 (see FIG. 2). The conveying roller 31 has a shaft extending in the right-left direction, and the conveying motor 32 is connected to the shaft of the conveying roller 31. When the conveying motor 32 is driven to rotate, the conveying roller 31 rotates integrally with the shaft and conveys the printing medium A on the platen 11 in the front-rear direction.

The moving device 40 includes the carriage 41, two guide rails 42, an endless belt 43, and a moving motor 44 (see FIG. 2). The carriage 41 has a box-like shape and mounts the head 20 thereon. The two guide rails 42 extend, in parallel, in the right-left direction so as to traverse above the platen 11 that is arranged immediately below the two guide rails 42. The two guide rails 42 are arranged separately in the front-rear direction such that all the nozzles 21 provided to the head 20 are arranged between the two guide rails 42. The carriage 41 is supported by the two guide rails 42 so as to be movable in the right-left direction within a particular movable range. The carriage 41 is connected to the endless belt 43. The endless belt is wound around pulleys 45 and 46 provided to one of the guide rails 42, and is connected to the moving motor 44 through the pulley 45. According to this configuration, the moving device 40 operates such that, when the moving motor 44 is driven to rotate, the endless belt 43 runs and moves the carriage 41 and thus the head 20 mounted on the carriage 41, in the right-left direction along the guide rails 42.

As shown in FIG. 2, the printing apparatus 10 has the controller 50. Further, the printing apparatus 10 includes a communication IF (interface) 51, a storage device 52, a head driving circuit 53, a first driving circuit 54 and a second driving circuit 55, which are connected to the controller 50. The communication IF 51 is a connecting device configured to connect the printing apparatus 10 to an external device B which exists independently from the printing apparatus 10. The external device B may include a computer, a communication network, a recording medium, a display, and other printing apparatuses. According to the above configuration, the printing apparatus 10 may obtain image data from the external device B via the communication IF 51. An example of the image data is raster data representing an image to be printed on the printing medium A.

The storage device 52 is a memory configured to be accessible from the controller 50 and has at least one of a RAM, a ROM, an E2PROM, and an NVRAM, for example. The storage device 52 is configured to store various data used for data processing by the controller 50 and computer programs. By executing the computer programs, the controller 50 performs various data processing.

The controller 50 is a computer, which includes a processor such as a CPU, integrated circuits such as an ASIC, or both. The controller 50 controls the operation of various components of the printing apparatus 10 by executing computer programs stored in the storage device 52 while referring to data also stored in the storage device 52. It should be noted that the controller 50 may be composed of a single device, or multiple devices arranged in a distributed manner so that the multiple devices work together to operate as the printing apparatus 10.

The head driving circuit 53 is electrically connected to the driving elements 22 of the head 20. The controller 50 generates control signals to drive the respective driving elements 22 based on the image data, and the head driving circuit 53 generates the driving signals based on the control signals, respectively. The driving elements 22 are then driven based on the driving signals to apply particular ejection energies to the ink in the head 20 at particular timings.

The first driving circuit 54 is electrically connected to the conveying motor 32 of the conveying device 30. The controller 50 generates a control signal to drive the conveying motor 32 based on the image data, and the first driving circuit 54 generates a driving signal based on the thus generated control signal. Then, based on the driving signal, the conveying motor 32 intermittently or continuously conveys the printing medium A on the platen 11, while stopping the printing medium A at particular positions on the platen 11.

The second driving circuit 55 is electrically connected to the moving motor 44 of the moving device 40. The controller 50 generates a control signal to drive the moving motor 44 based on the image data, and the second driving circuit 55 generates a driving signal based on the control signal. Then, based on the driving signal, the moving motor 44 moves the carriage 41 that mounts the head 20 in the right-left direction at a variable speed, while stopping the carriage 41 at arbitrary positions within a movable range of the carriage 41.

The printing apparatus 10 further includes an input device 15 and an output device 16. Both the input device 15 and the output device 16 are electrically connected to the controller 50. The input device 15 is a device configured to input information into the controller 50. Examples of the input device 15 include push buttons, a pointing device, and the like. The output device 16 is a device configured to output information under control by the controller 50. An example of the output device 16 is a display.

The printing apparatus 10 further includes a sound sensor 17. The sound sensor 17 is electrically connected to the controller 50. The sound sensor 17 is a sensor configured to collect sound around the sound sensor 17. An example of the sound sensor 17 is a microphone. The sound sensor 17 is configured to generate a sound signal corresponding to a waveform of the collected sound, and outputs the sound signal to the controller 50. Based on this sound signal, the controller 50 obtains a volume of the sound, such as an ambient volume value which is a volume of ambient sound, and an operating volume which is a volume of an operating sound of the printing apparatus 10. It is noted that the sound sensor 17 may be configured to collect an ambient sound, obtain a volume value based on the sound signal corresponding to a waveform of the collected sound, and output the volume value to the controller 50 based on the sound signal. It is noted that the ambient sound is an example of first sound according to aspects of the present disclosure and the operating sound is an example of second sound according to aspects of the present disclosure. It is noted that the ambient volume value is an example of a first volume value according to aspects of the present disclosure.

Printing Operation

The controller 50 executes a printing operation to print an image on the printing medium A by causing the nozzles 21 to eject ink droplets based on the image data. In the printing operation, the controller 50 performs a pass operation and a conveyance operation. In the pass operation, the controller 50 causes the head 20 to eject ink droplets from the head 20 (i.e., through the nozzles 21) toward the printing medium A, while moving the carriage 41 rightward or leftward. In the conveyance operation, the controller 50 conveys the printing medium A frontward. In this way, the printing apparatus 10 alternately repeats the pass operation and the conveyance operation to proceeds the printing operation.

Control Method for Printing Device

Figure 3A:
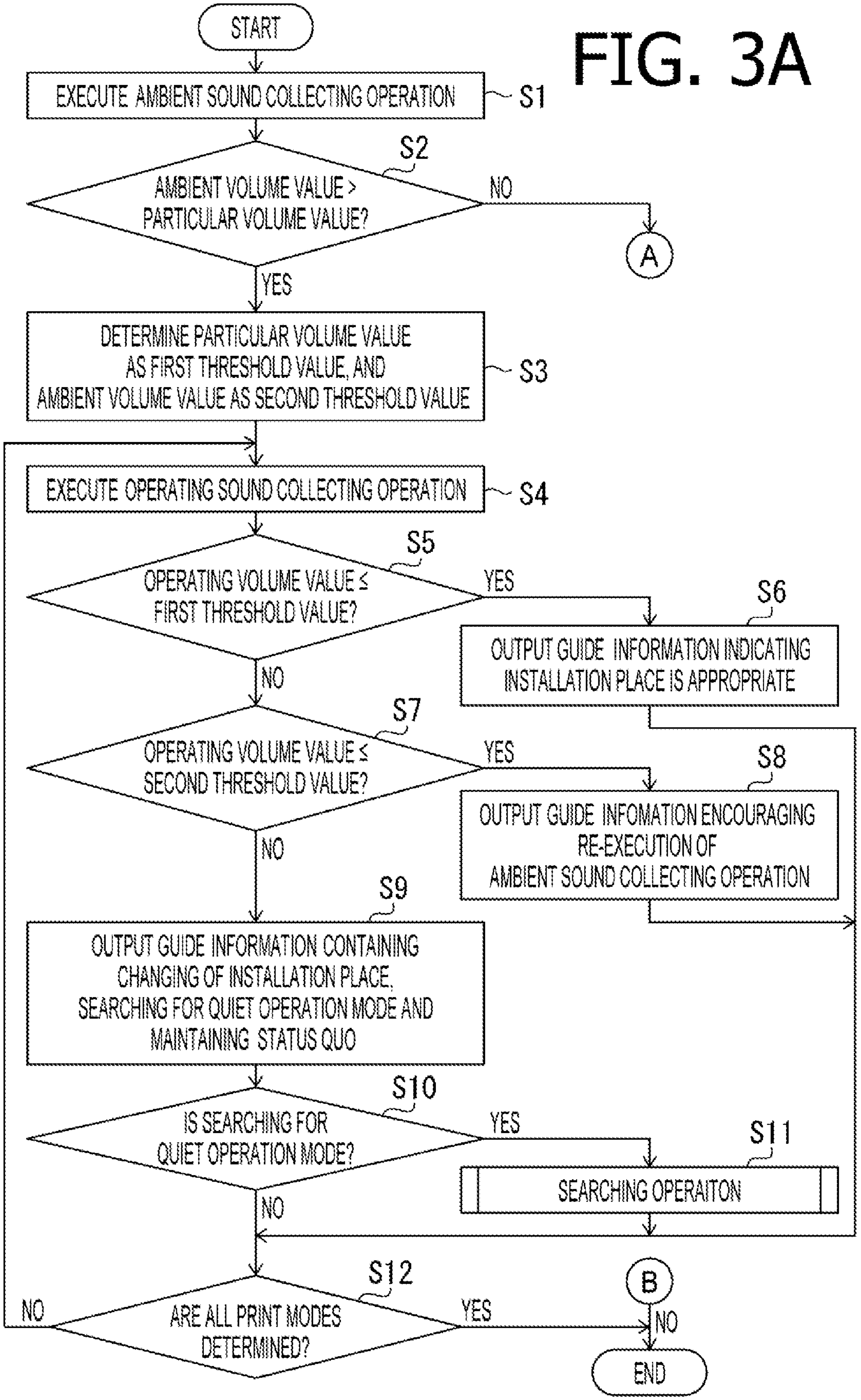
FIGS. 3A and 3B show a flowchart illustrating a control method for the printing apparatus.
Figure 3B:
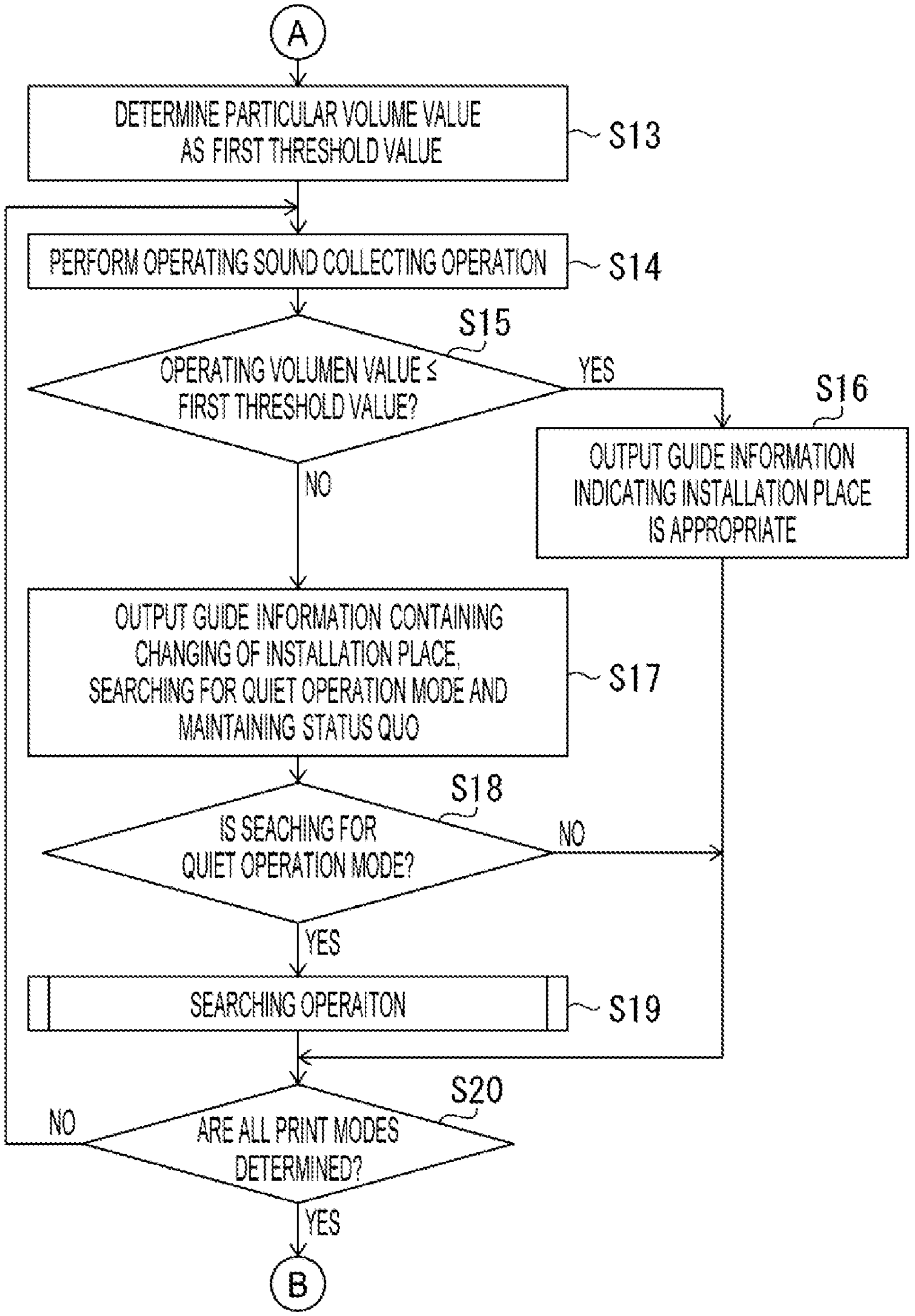

FIGS. 3A and 3B show a flowchart showing an example of a control method for the printing apparatus 10 performed by the controller 50. This control method is executed at particular timings other than when printing operations are being executed.

The controller 50 executes an ambient sound collection operation that causes the sound sensor 17 to collect ambient sound when the carriage 41 is stopped (S1). The sound sensor 17 collects a background sound when the carriage 41 is not moving as the ambient sound, and the controller 50 calculates the ambient volume value, which represents a volume of the ambient sound, based on the sound signal of the ambient sound, and stores the ambient volume value in the storage device 52.

The controller 50 determines whether the ambient volume value is greater than a particular volume value (S2). When the ambient volume value is greater than the particular volume value (S2: YES), the controller 50 determines the particular volume value to be a first threshold value, determines the ambient volume value to be a second threshold value (S3), and stores the first threshold value and the second threshold value in the storage device 52. In such a case, the second threshold value is greater than the first threshold value because the ambient volume value is greater than the particular volume value.

Then, the controller 50 moves the carriage 41 and executes an operating sound collecting operation to make the sound sensor 17 collect the operating sound during the movement of the carriage 41 (S4). In this operating sound collecting operation, in accordance with the operation configuration of the carriage 41 defined by the print mode of the printing operation, for example, the carriage 41 is moved in accordance with at least one of a speed, a changing rate of speed, and a stopping time. When the printing apparatus 10 has one printing mode, the printing mode is used. When the printing apparatus 10 has multiple printing modes, one of the printing modes is selected for use.

The sound sensor 17 is configured to collect ambient sounds of the carriage 41 when the carriage 41 is being moved as an operating sound. The controller 50 calculates an operating volume value which represents a volume value of the operating sound based on the sound signal of the operating sound, and the controller 501 stores the operating volume value in the storage device 52. This operating sound includes sound generated by movement of the carriage 41, and sound accompanying the movement of the carriage 41. The sound accompanying the movement of the carriage 41 includes sound generated by vibration of the casing 13 and a sound generated by wobbling of the installation place C which is caused by the vibration of the casing 13. It is noted that the operating volume value is an example of a second volume value according to aspects of the present disclosure.

In other words, the carriage 41 starts moving from one end of the movable range of the carriage in the right-left direction, accelerates, moves at a constant speed, then decelerates toward the other end of its movable range and stops. The acceleration and deceleration of the carriage 41 cause the casing 13 to be subjected to a force, and the force and its reaction cause the casing 13 to vibrate in the right-left direction. When the installation place C (e.g., a stand) of the casing 13 is unstable and easily wobbles, the installation place C will be wobbled by the vibration of the casing 13. In such a case, not only sound is generated by the wobbling, but the sound volume value due to the movement of the carriage 41 and the wobbling of the casing 13 is greater than it would be if the carriage 41 were being moved when the printing apparatus 10 is installed at a stable installation place C.

In this way, the operating volume value of the printing apparatus 10 installed at the unstable installation place C becomes greater than a normal volume value, which is the operating volume value when the printing apparatus 10 is installed at the stable installation place C. Thus, the controller 50 executes a guidance operation that causes the output device 16 to output guide information about the installation place C of the casing 13 based on the operating volume value.

The controller 50 executes a comparing operation to compare the operating volume value with a threshold value, and the guidance operation to output the guide information according to the result of the comparison between the operating volume value and the threshold value. As well as processes of S2 and S3 explained above, when the ambient volume value is greater than a particular volume value, the first and second threshold values are used as the threshold values mentioned above. In the guidance operation, the guide information corresponding to the result of comparison of the operating volume value with the second threshold value is output.

Concretely, the controller 50 determines, in the comparing operation, whether or not the operating volume value is less than or equal to the first threshold value (S5). When the operating volume value is less than or equal to the first threshold value (S5: YES), the controller 50 causes, as the guidance operation, the output device 16 to output guide information indicating that the installation place C is appropriate (S6). As above, when the operating volume value is less than or equal to the first threshold value, the operating volume value is the normal volume value, and the installation place C is stable. Thus, a user can recognize, based on the guide information, that the installation place C is appropriate in terms of stability based on the operating volume value. It is noted that, in addition to the guide information, the printing mode used in S4 may be output to the output device 16. In such a case, the user can recognize whether the installation place C is appropriate by associating the print mode with the guide information. Further, the controller 50 may store the print mode and the result of the determination in S5 in the storage device 52 in an associated manner. Then, the controller 50 proceeds to S12.

On the other hand, if the operating volume value is greater than the first threshold value (S5: NO), the controller 50 determines whether or not the operating volume value is less than or equal to the second threshold value in a comparing operation (S7). If the operating volume is greater than the first threshold value and less than or equal to the second threshold value (S7: YES), the controller 50 causes the output device 16 to output guide information, as the guidance operation, that encourages re-execution of the ambient sound collecting operation (S8). As above, when the operating volume value is greater than the normal volume value but less than or equal to the ambient volume value, the user may not feel uncomfortable with this operating sound. However, there may be times when the ambient volume value is low, so the guide information will encourage re-collection of the ambient volume value in a quieter condition where the ambient volume value is low. In this way, the user can execute the ambient sound collecting operation in S1 and subsequent processes based on the guide information when the surroundings are quiet.

In addition to this guide information, the printing mode used in S4 may be output to the output device 16. In such a case, the user can recognize the print mode and the guide information in an associated manner. The controller 50 may also store this printing mode and the result of the determination in S5 in the storage device 52. Then, the controller 50 proceeds to S12.

When it is determined that the operating volume value is greater than the second threshold value (S7: NO), the controller 50 causes the output device 16 to output the guide information containing options of the changing of installation place C, the searching for a quiet operation mode, and the maintaining of the status quo as options of the guidance operation (S9). As above, when the operating volume value is greater than the normal volume value and the ambient volume value, the installation place C is not appropriate in view of the stability of the printing apparatus 10 based on the operation volume value. Therefore, the user selects one of the options of the guide information using the input device 15. Then, information regarding the selected option is transmitted from the input device 15 to the controller 50. It is noted that the output device 16 may also be caused to output the print mode used in S4 in addition to the guide information. In such a case, the user can recognize whether the installation place C is appropriate by associating the print mode and the guide information. Further, the controller 50 may store the print mode and the determination result in S5 in the storage device 52 in an associated manner.

The controller 50 then performs a determining operation to determine whether or not the information to select searching for the quiet operation mode among the guide information has been input from the input device 15 (S10). If the information of options other than the searching for the quiet operation mode among the output guide information is input (S10: NO), the controller 50 proceeds to S12.

When the user selects changing the installation place C with the input device 15 and inputs the same to the controller 50, the user changes the installation place C of the printing apparatus 10 from the current installation place C to any other installation place C. In this way, when the printing apparatus 10 is installed at a stable installation place C, the wobbling of the installation place C during the operation of the printing apparatus 10 can be suppressed, and thus generation of a noise of which volume value is greater than the operating volume value of the printing apparatus 10 itself can be suppressed. When the user is unable to change the installation place C from the current installation place C, the user selects the maintaining of the status quo through the input device 15 to enter the same into the controller 50.

When information to select the searching for the quiet operation mode is input through the input device 15 (S10: YES), the controller 50 executes the searching operation (S11) to search for the operation mode in which the operating volume value is less than or equal to the second threshold value by changing an operation mode of the carriage 41 during the operating sound collecting operation. In this searching operation, the controller 50 changes one of the following parameters (parameter groups): (1) the speed of the carriage 41, (2) the changing rate of the speed of the carriage 41, (3) the stopping time of the carriage 41, (4) the speed and the changing rate of the speed of the carriage 41, (5) the speed and stopping time of the carriage 41, (6) the changing rate of the speed and stopping time of the carriage 41, or (7) the speed of the carriage 41, the changing rate of the speed, and the stopping time of the carriage 41, in such a manner that the operating volume value is less than or equal to the second threshold value.

Figure 4:
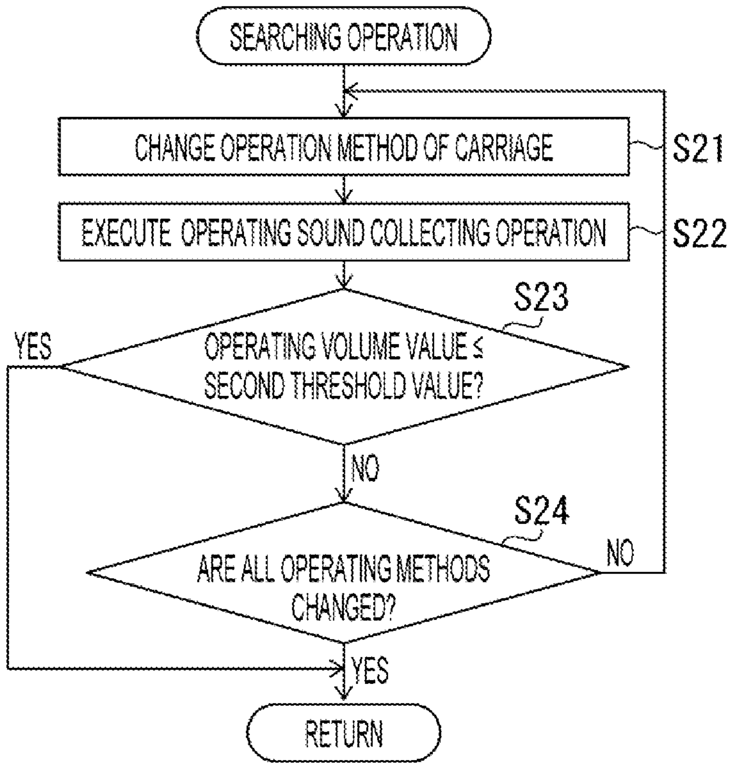
FIG. 4 is a flowchart illustrating an example of a searching operation.

For example, the searching operation is performed by the controller 50 according to an exemplary flowchart shown in FIG. 4. As described above, the acceleration and deceleration of the carriage 41 during the movement of the carriage 41 causes vibration of the casing 13 and, in turn, wobbling of the installation place C. Therefore, the controller 50 changes the operation mode of the carriage 41 from the mode when the operating sound collecting operation in step S4 to another operation mode (S21). At least one of the operation modes of the carriage 41, e.g., one of or any combination of the speed of the carriage 41, the changing rate of the speed, and the stopping time, is changed. For example, the movable range of the carriage 41 in the right-left direction includes an acceleration section in which the carriage 41 moves while accelerating, a constant-speed section in which the carriage 41 moves at a constant speed, and a deceleration section in which the carriage 41 moves while decelerating.

Compared to the operating sound collecting operation in S4, when the speed of the carriage 41 is lowered without changing dimensions of the acceleration section of the carriage 41, an absolute value of the changing rate of the speed during the acceleration of the carriage 41 becomes smaller. Further, in comparison to a case during the operating sound collection operation in S4, when the speed of the carriage 41 is lowered without changing a dimension of the deceleration section of the carriage 41, the absolute value of the changing rate of the speed during the deceleration of the carriage 41 becomes smaller. Thus, by reducing the absolute value of the changing rate of the speed, the force acting on the casing 13 due to the acceleration and the deceleration during the movement of the carriage 41 is reduced, the vibration of the casing 13 and the wobbling of the installation place C are reduced, and thus the operating volume value can be reduced.

Further, compared to the operating sound collecting operation in S4, the stopping time of the carriage 41 is longer in the reciprocating movement of the carriage 41 between the time when the carriage 41 stops moving and the time when the carriage 41 starts moving next. In this way, the time between the time when the force due to deceleration acts on the casing 13 and the time when the force due to acceleration acts on the casing 13 after the carriage 41 starts moving is extended. Since the force from the acceleration acts on the casing 13 after the vibration of the casing 13 caused by the force from this deceleration is damped, the vibration of the casing 13, the wobbling of the installation place C, and the operating volume value can be reduced.

Then, the controller 50 moves the carriage 41 according to the operation mode changed in S21, while executing the operating sound collecting operation that causes the sound sensor 17 to collect the operating sound during the movement of the carriage 41 (S22). The controller 50 then calculates the operating volume value based on the sound signal of the operating sound collected by the sound sensor 17 when the carriage 41 moves, and stores the operating volume value in the storage device 52.

The controller 50 then determines whether or not the operating volume is less than or equal to the second threshold value (S23). When the operating volume value is greater than the second threshold value (S23: NO), the controller 50 determines whether all operating modes have been changed (S24). When there is an operation mode that has not been changed (S24: NO), the controller 50 returns to the process of S21 and executes the process from S21 onward. On the other hand, when all the operation modes have been changed (S24: YES), the controller 50 proceeds to S12 in FIG. 3A.

When the operating volume value is less than or equal to the second threshold value (S23: YES), the controller 50 stores the operation mode changed in S21 when the operating volume value is less than or equal to the second threshold value as the operation mode of the carriage 41. For example, when the printing operation is executed in such a quiet operation mode, the carriage 41 moves in the operation mode changed in step S21, thereby reducing the wobbling of the installation location C caused by the movement of the carriage 41 and suppressing the generation of noise louder than the operation noise generated by the printing apparatus 10 itself due to the wobbling of the installation location C during operation of the printing apparatus 10. The controller 50 then proceeds to S12 in FIG. 3A.

In S12, the controller 50 determines whether the operating sound has been determined for all print modes. When there remain print modes that the operating sound has not been determined (S12: NO), the controller 50 returns to S4, selects one of the remained print modes, and executes the operating sound collecting operation by moving the carriage 41 in accordance with the selected operation mode. Then, the controller 50 performs processes in S4 onwards. When the operation modes of the carriage 41 in all the print modes have been determined (S12: YES), the controller 50 terminates the process shown in FIGS. 3A and 3B.

When it is determined that the ambient volume value is less than or equal to a particular volume (S2: NO), the controller 50 determines the particular volume to be the first threshold value (S13) but not the second threshold value, and stores the first threshold value in the storage device 52. Then, the controller 50 performs the operating sound collecting operation to cause the carriage 41 to move and to cause the sound sensor 17 to collect the operation sound when the carriage 41 is moving (S14). The operating sound collecting operation is the same as the operation performed in S4. In the operating sound collecting process, the controller 50 calculates the operating volume value based on the sound signal of the operating sound collected by the sound sensor 17 when the carriage 41 is moving, and stores the operating volume value as calculated in the storage device 52.

The controller 50 determines whether the operating volume value is less than or equal to the first threshold value in the comparing operation (S15). When the operation volume value is less than or equal to the first threshold value (S15: YES), the controller 50 causes the output device 16 to output the guide information related to the installation place C in the guidance operation (S16). The guide information indicates the installation place C is an appropriate place. This guidance operation is the same as the operation in S6. As this guidance operation is performed, the user can recognize that the installation place C is the appropriate place in view of the stability based on the operating sound. Thereafter, the process proceeds to S20.

On the other hand, when the operating volume value is greater than the first threshold value (S15: NO), the controller 50 causes the output device 16 to output the guide information containing options of changing of the installation place C, searching for the quiet operation mode, and maintaining of the status quo in the guidance operation (S17). This guidance operation is the same as the operation in S9. Then, the controller 50 performs the determining process to determine whether information to select the searching for the quiet operation mode among the guide information is input through the input device 15 (S18). This determining operation is the same as the operation in S10. When it is determined that information of a selection other than the searching for the quiet operation mode is input (S18: NO) among the guide information as output, the controller proceeds to S20.

In S18, when information to select the search for the quiet operation mode is input through the input device 15 (S18: YES), the controller 50 executes a searching operation (S19) to search for an operation mode in which the operation volume value is less than or equal to the first threshold value by changing the operation mode of the carriage 41 during the operating sound collecting operation. In this searching operation, the operation mode is searched for such that the operation volume value is less than or equal to the first threshold value, whereas in the searching operation in S11, the operation mode is searched for such that the operation volume value is less than or equal to the second threshold value. Except for the processes above, the searching operation in S19 is the same as the searching operation in S11.

In this search operation, the controller 50 changes one of the following parameters (parameter groups): (1) the speed of the carriage 41, (2) the changing rate of the speed of the carriage 41, (3) the stopping time of the carriage 41, (4) the speed and the changing rate of the speed of the carriage 41, (5) the speed and stopping time of the carriage 41, (6) the changing rate of the speed and stopping time of the carriage 41, or (7) the speed of the carriage 41, the changing rate of the speed, and the stopping time of the carriage 41, in such a manner that the operating volume value is less than or equal to the first threshold value.

In the example shown in FIG. 4, the controller 50 changes the operation mode of the carriage 41 (S21) from the operation mode when the operating sound collecting operation is executed at S14 to another operation mode. Then, the controller 50 determines whether the operating volume value in the operating sound collecting operation executed in S22 is less than or equal to the first threshold value in S23. In S23, when the operating volume value is less or equal to the first threshold value, the controller 50 stores the operation mode in which the operating volume is less than or equal to the first threshold value, and which is the operation mode changed in S21, in the storage device 52 as the quiet operation mode. By adopting this quiet operation mode, it is possible to suppress the noise that is louder than the operating volume of the printing apparatus 10 itself due to the wobbling of the installation place C during the operation of the printing apparatus 10. Then, the controller 50 proceeds to S20 of FIG. 3B.

In S20, the controller 50 determines the controller 50 determines whether the operating sound has been determined for all print modes. When there remain printing modes that the operating sound has not been determined (S20: NO), the controller 50 returns to S14. Then, in the operating sound collecting operation in S14, one of the remaining printing modes is selected, and the carriage 41 is moved in the operating mode in accordance with the selected printing mode. Thereafter, the controller 50 performs processes in S14 onwards. When the operating modes of the carriage 41 in all the printing modes have been determined (S20: YES), the process is terminated.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above-described embodiment, all the print modes are determined in S12 and S20. However, some of the print modes may not be determined. For example, the printing operation may have multiple printing modes with different carriage 41 moving speeds. In such a case, in the operating sound collecting operation in S4 and S14, the controller 50 may select the printing mode with the fastest movement speed of the carriage 41 among multiple printing modes in order, and move the carriage 41 in the operating mode of the selected printing mode. It is noted that the operating volume value may tend to be greater as the moving speed of the carriage 41 is faster. Therefore, if the operating sound collecting operation is executed in the operating mode of the high speed printing mode where the carriage 41 moves at a high speed, and the operating sound volume value is less than or equal to the first threshold value, the processes of S4, S14, and thereafter for the lower speed printing modes where the carriage 41 moves at slower speeds may not be executed.

In the above embodiment, when the operating volume value is greater than the second threshold value (S7: NO), the controller 50 causes the output device 16 to output the guide information including options of changing the installation place C, searching for the quiet operation mode, and maintaining the current status as the guidance operations (S9). However, the guidance operations are not limited to those described above. For example, the controller 50 may cause the output device 16 to output the guide information that includes only the changing of the installation place C as the guidance operation. Further, the controller 50 may cause the output device 16 to output the guide information including only the searching for the quiet operation mode as the guidance operation. Further, the controller 50 may cause the output device 16 to output the guide information including the changing of the installation place C and the maintaining of the status quo as the guidance operations. Furthermore, the controller 50 may cause the output device 16 to output the guide information including the searching for the quiet operation mode and the maintaining of the status quo as the guidance operation. Furthermore, the controller 50 may cause the output device 16 to output the guide information including the changing of the installation place C and the searching for the quiet operation mode as the guidance operations.

In S17, as in S9, the controller 50 may cause the output device 16 to output the guide information including only the changing of the installation place C as the guidance operation. Alternatively, the controller 50 may cause the output device 16 to output the guide information including only the searching for the quiet operation mode as the guidance operation. Further alternatively, the controller 50 may cause the output device 16 to output the guide information including the changing of the installation place C and the maintaining of the status quo as the guidance operation. Still alternatively, the controller 50 may cause the output device 16 to output the guide information including the searching for the quiet operation mode and the maintaining of the status quo as the guidance operation. Further alternatively, the controller 50 may cause the output device 16 to output the guide information including the changing of the installation place C and the searching for the quiet operation mode as the guidance operation.

From the above description, many improvements and other embodiments of the present disclosures will be apparent to those skilled in the art. Accordingly, the above description should be construed as an example only, and is provided for the purpose of instructing those skilled in the art as to the best manner in which the present disclosures may be performed. Details of the configurations and/or functions of the above-described embodiment and modifications may be substantially changed without departing from aspects of the present disclosures.

What is claimed is:

1. A printing apparatus, comprising:
- a head configured to eject ink droplets;
- a carriage mounting the head thereon;
- a casing accommodating the head and the carriage;
- a sound sensor configured to collect a first sound having a corresponding first volume value and output a sound signal corresponding to the first sound;
- an output device configured to output information; and
- a controller,
- wherein the controller is configured to perform:
  - causing the carriage to move and causing the sound sensor to collect a second sound that is generated when the carriage is being moved and is different from the first sound; and
  - causing the output device to output guide information related to an installation place of the casing based on a second volume value corresponding to the second sound.

2. The printing apparatus according to claim 1,
- wherein the controller is configured to perform:
  - receiving the sound signal from the sound sensor to obtain the second volume value corresponding to the second sound.

3. The printing apparatus according to claim 1,
- wherein the controller is configured to perform:
- causing the sound sensor to collect the first sound when the carriage is stopped; and comparing the second volume value with threshold values, the threshold value including a first threshold value and a second threshold value greater than the first threshold value, and wherein, in the comparing, the controller is further configured to perform:

determining whether the first volume value corresponding to the first sound is greater than a particular volume value;

comparing the second volume value with the second threshold value when determining that the first volume value is greater than the particular volume value, and causing the output device to output the guide information corresponding to a comparing result of comparing the second volume value with the second threshold value.

4. The printing apparatus according to claim 3, wherein the controller is configured to perform:

receiving the sound signal from the sound sensor to obtain the first volume value corresponding to the first sound.

5. The printing apparatus according to claim 3, wherein the controller is configured to perform:

determining whether the second volume value is less than or equal to the first threshold value; and causing the output device to output the guide information related to the installation place of the casing when determining that the second volume value is less than or equal to the first threshold value.

6. The printing apparatus according to claim 3, wherein the controller is configured to perform:

determining whether the second volume value is less than or equal to the first threshold value;

determining whether the second volume value is less than or equal to the second threshold value;

causing the output device to output the guide information encouraging re-execution of collecting the first sound when determining that the second volume value is greater than the first threshold value and less than or equal to the second threshold value; and collecting the first sound after outputting the guide information.

7. The printing apparatus according to claim 3, wherein the controller is configured to perform:

determining whether the second volume value is less than or equal to the first threshold value;

determining whether the second volume value is less than or equal to the second threshold value; and causing the output device to output the guide information containing options of changing of the installation place, searching for a quiet operation mode of the printing apparatus, and maintaining of status quo when determining that the second volume value is greater than both the first threshold value and the second threshold value.

8. The printing apparatus according to claim 7, further comprising an input device configured to input information, wherein the controller is configured to perform:

determining whether information to select searching for the quiet operation mode among the guide information has been input from the input device; and searching for a particular operation mode by changing an operation mode of the carriage during the second sound collecting operation when determining that the information to select searching for the quiet operation mode has been input from the input device, the second volume value being less than or equal to the second threshold value when the carriage moves in the particular operation mode.

9. The printing apparatus according to claim 8, wherein the controller is configured to perform changing one of following parameters:

speed of the carriage;

changing rate of the speed of the carriage;

stopping time of the carriage;

the speed and the changing rate of the speed of the carriage;

the speed and the stopping time of the carriage;

the changing rate of the speed and the stopping time of the carriage; and the speed, the changing rate of the speed, and the stopping time of the carriage, in such a manner that the second volume value is less than or equal to the second threshold value.

10. The printing apparatus according to claim 3, wherein the controller is configured to perform determining whether the second volume value is less than or equal to the first threshold value when determining that the first volume value is less than or equal to the particular volume value in the comparing; and causing the output device to output the guide information containing options of changing of the installation place, searching for a quiet operation mode of the printing apparatus, and maintaining of status quo when determining that the second volume value is greater than the first threshold value.

11. The printing apparatus according to claim 10, further comprising an input device configured to input information, wherein the controller is configured to perform:

determining whether information to select searching for the quiet operation mode among the guide information has been input through the input device; and searching for a particular operation mode by changing an operation mode of the carriage during the second sound collecting operation when determining that the information to select searching for the quiet operation mode has been input through the input device, the second volume value being less than or equal to the first threshold value when the carriage moves in the particular operation mode.

12. The printing apparatus according to claim 8, wherein the controller is configured to perform changing one of following parameters:

speed of the carriage;

changing rate of the speed of the carriage;

stopping time of the carriage;

the speed and the changing rate of the speed of the carriage;

the speed and the stopping time of the carriage;

the changing rate of the speed and the stopping time of the carriage; and the speed, the changing rate of the speed, and the stopping time of the carriage, in such a manner that the second volume value is less than or equal to the first threshold value.

13. A method of controlling a printing apparatus including a head configured to eject ink droplets, a carriage mounting the head thereon, a casing accommodating the head and the carriage, a sound sensor configured to collect a first sound having a corresponding first volume value and output a sound signal corresponding to the first sound, and an output device configured to output information, wherein the method comprises:

causing the carriage to move and causing the sound sensor to collect a second sound that is generated when the carriage is being moved; and causing the output device to output guide information related to an installation place of the casing based on a second volume value corresponding to the second sound.

14. A non-transitory computer-readable medium containing computer-executable instructions to be executed by a computer of a printing apparatus including a head configured to eject ink droplets, a carriage mounting the head thereon, a casing accommodating the head and the carriage, a sound sensor configured to collect a first sound having a corresponding first volume value and output a sound signal corresponding to the first sound, an output device configured to output information, and a controller, wherein the instructions cause, when executed by the controller, the printing apparatus to perform:

causing the carriage to move and causing the sound sensor to collect a second sound that is generated when the carriage is being moved; and causing the output device to output guide information related to an installation place of the casing based on a second volume value corresponding to the second sound.

* * * * *